United States Patent
Peterson et al.

(10) Patent No.: US 12,282,365 B2
(45) Date of Patent: Apr. 22, 2025

(54) INFORMATION INDICATION ASSEMBLY CONFIGURED TO BE UTILIZED WITH A COMPONENT OF AN INFORMATION HANDLING SYSTEM

(71) Applicant: Dell Products L.P., Round Rock, TX (US)

(72) Inventors: Chris Everett Peterson, Austin, TX (US); Brandon Joel Brocklesby, Pflugerville, TX (US); Sean Padrig Odonnell, Poughkeepsie, NY (US)

(73) Assignee: Dell Products L.P., Round Rock, TX (US)

( * ) Notice: Subject to any disclaimer, the term of this patent is extended or adjusted under 35 U.S.C. 154(b) by 467 days.

(21) Appl. No.: 17/816,128

(22) Filed: Jul. 29, 2022

(65) Prior Publication Data

US 2024/0036622 A1    Feb. 1, 2024

(51) Int. Cl.
*G06F 1/20*        (2006.01)
*G05B 19/4155*     (2006.01)

(52) U.S. Cl.
CPC ............ *G06F 1/20* (2013.01); *G05B 19/4155* (2013.01); *G05B 2219/49216* (2013.01)

(58) Field of Classification Search
CPC ........................................................ G06F 1/20
See application file for complete search history.

(56) References Cited

U.S. PATENT DOCUMENTS

| 2014/0098481 A1* | 4/2014 | Hartman | F04D 25/166 |
| | | | 361/679.31 |
| 2022/0003246 A1* | 1/2022 | Doglio | F04D 29/601 |
| 2022/0035425 A1* | 2/2022 | Chang | H01R 13/6273 |

* cited by examiner

*Primary Examiner* — Paul B Yanchus, III
(74) *Attorney, Agent, or Firm* — McDermott Will & Emery LLP

(57) ABSTRACT

In one or more embodiments, an information handling system may include an information indication assembly. For example, the information indication assembly may include at least one light emitter; multiple conductors coupled to the at least one light emitter; a pin that includes a rigid material and that permits the first plurality of conductors to pass through; and a grommet that includes an elastic material and configured to house the pin. In one instance, the pin and the grommet may be aligned along a longitudinal axis of the information indication assembly. In a second instance the pin and the grommet form a fastener of a fan associated with the information handling system. In another instance, the elastic material may mitigate vibrations from the fan. In one or more embodiments, a printed circuit board may include the multiple conductors. For example, the printed circuit board may be a flexible printed circuit board.

20 Claims, 7 Drawing Sheets

INFORMATION INDICATION ASSEMBLY CONFIGURED TO BE UTILIZED WITH A COMPONENT OF AN INFORMATION HANDLING SYSTEM

BACKGROUND

Field of the Disclosure

This disclosure relates generally to information handling systems and more particularly to an information indication assembly that may be configured to be utilized by a component of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, an information handling system may include: at least one processor; a memory medium, coupled to the at least one processor, that stores an operating system and at least one application executable by the at least one processor; a fan; and an information indication assembly. For example, the information indication assembly may include: at least one light emitter; first multiple conductors coupled to the at least one light emitter; a pin that includes a rigid material and that permits the first multiple conductors to pass through; and a grommet that includes an elastic material and configured to house the pin. In one instance, the pin and the grommet may be aligned along a longitudinal axis of the information indication assembly. In a second instance, the pin and the grommet may form a fastener of the fan. In another instance, the elastic material may mitigate vibrations from the fan to at least one component of the information handling system.

In one or more embodiments, the rigid material may include at least one of a metal and a metal alloy, among others. In one or more embodiments, the rigid material may include a rigid polymer. In one or more embodiments, the elastic material may include a rubber polymer. In one or more embodiments, the at least one light emitter may include at least one light emitting diode (LED). In one or more embodiments, the information indication assembly may further include a printed circuit board. For example, the printed circuit board may include the first multiple conductors. For example, the printed circuit board may be a flexible printed circuit board. In one or more embodiments, the pin may include second multiple conductors arranged in a radial pattern. For example, the second multiple conductors may be coupled to the first multiple conductors. In one or more embodiments, the information handling system may include a fan module. For example, the fan module may include the fan. In one or more embodiments, the information handling system may include a power supply. For example, the power supply may include the fan.

In one or more embodiments, an information indication assembly may include: at least one light emitter; first multiple conductors coupled to the at least one light emitter; a pin that includes a rigid material and that permits the first plurality of conductors to pass through; and a grommet that includes an elastic material and configured to house the pin. In one example, the pin and the grommet may be aligned along a longitudinal axis of the information indication assembly. In a second example, the pin and the grommet may form a fastener of a fan associated with an information handling system. In another example, the elastic material may mitigate vibrations from the fan.

In one or more embodiments, the rigid material may include at least one of a metal and a metal alloy. In one or more embodiments, the rigid material may include a rigid polymer. In one or more embodiments, the elastic material may include a rubber polymer. In one or more embodiments, the at least one light emitter may include at least one LED. In one or more embodiments, the information indication assembly may further include a printed circuit board. For example, the printed circuit board may include the first multiple conductors. For instance, the printed circuit board may be a flexible printed circuit board. In one or more embodiments, the pin may include second multiple conductors arranged in a radial pattern. For example, the second multiple conductors may be coupled to the first multiple conductors. In one or more embodiments, a fan module of the information handling system may include the fan. In one or more embodiments, a power supply of the information handling system may include the fan.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
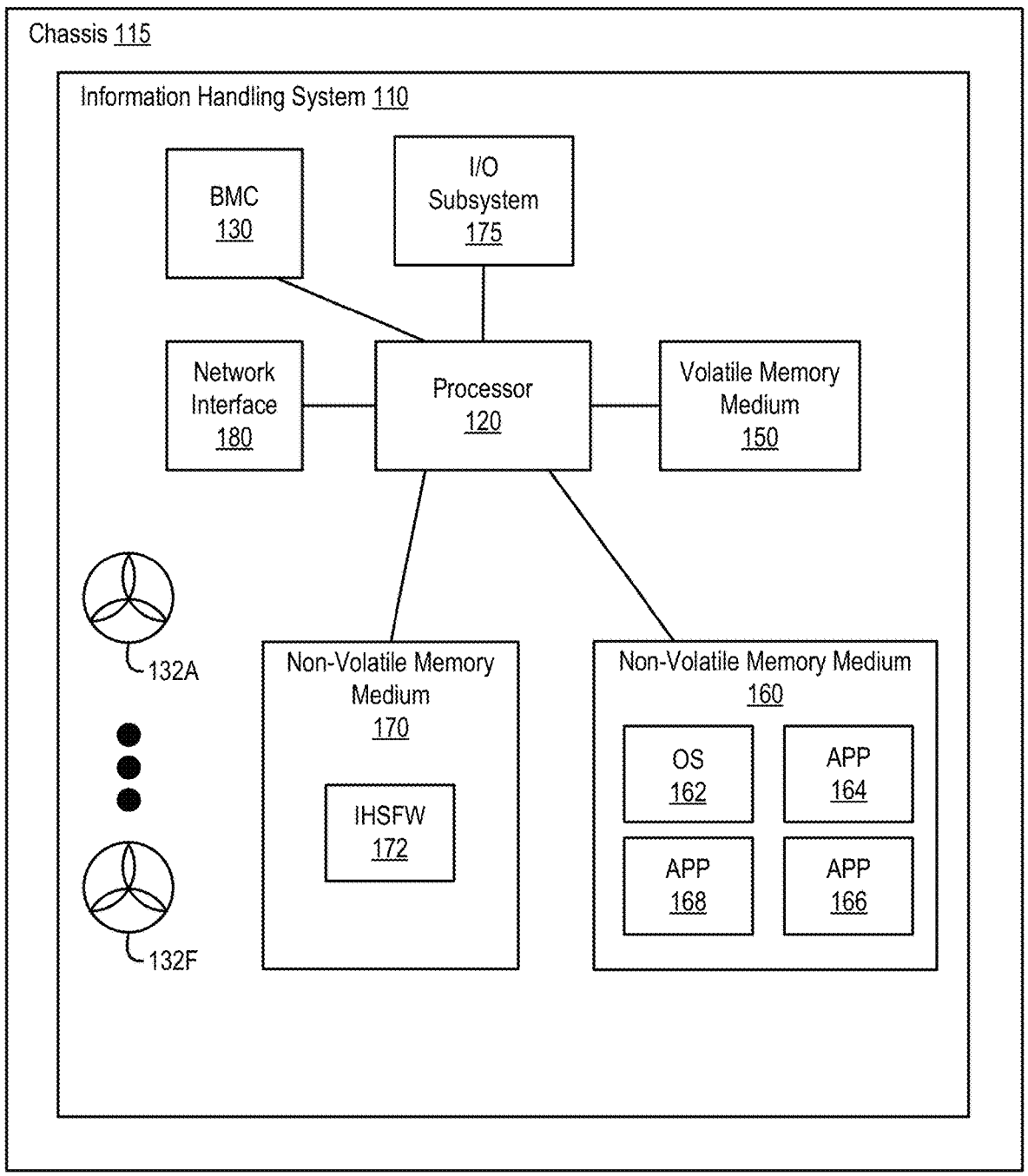
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, vibration isolation may reduce vibration transmission to an information handling system and/or to one or more components of the information handling system. In one example, when vibrations are transmitted to a hard disk drive, a performance of the hard disk drive may be degraded. In another example, when vibrations are transmitted to the hard disk drive, errors of the hard disk drive may increase.

In one or more embodiments, visual indicators may be at or near a fan to provide status of operation to a user (e.g., a person). For example, visual indicators and vibration isolators may compete for space in information handling system equipment. In one or more embodiments, a structure may combine light emission and vibration isolation. For example, the structure may include a vibration isolator, which may include a light emitter. In one instance, the vibration isolator, which may include a light emitter, may have a mounting interface to a fan. In another instance, the vibration isolator, which may include a light emitter, may have an electrical interface.

In one or more embodiments, a light emitter may provide one or more light emissions. For example, a light emitter may provide one or more light emissions via one or more colors of light. For instance, a light emitter may include one or more of an incandescent bulb, a light emitting transistor (LET), and a light emitting diode (LED), among others. In one or more embodiments, a handle (e.g., a pull handle) of a fan module or a power supply may include a light emitter. For example, including the light emitter in the handle may not consume surface area of an outlet (e.g., a vent) of a fan of the fan module or the power supply. In one or more embodiments, a cross section routing of dual support light emitter cable may be minimized along a length of a fan mount. In one example, this may reduce space, which may be utilized for multiple other features. In a second example, this may protect a light emitter during assembly by creating a pushing surface. In another example, this may permit an over-molded pin option, which may enable small sizing.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

In one or more embodiments, IHS 110 may include a chassis 115. For example, chassis 115 may house IHS 110. In one or more embodiments, IHS 110 may include a processor 120, a baseboard management controller (BMC)

130, a volatile memory medium 150, non-volatile memory media 160 and 170, an I/O subsystem 175, and a network interface 180. For example, BMC 130, volatile memory medium 150, non-volatile memory media 160 and 170, I/O subsystem 175, and network interface 180 may be communicatively coupled to processor 120.

In one or more embodiments, an information handling system may include one or more fans. For example, IHS 110 may include fans 132A-132F. Although IHS 110 is illustrated as including fans 132A-132F, IHS 110 may include any number of fans 132, according to one or more embodiments. In one or more embodiments, a fan 132 may move air. In one example, a fan 132 may move air within IHS 110. In a second example, a fan 132 may move air into IHS 110, may intake air into IHS 110, and/or may bring air into IHS 110. In another example, a fan 132 may move air out of IHS 110, may remove air from IHS 110, and/or may expel air from IHS 110. In one or more embodiments, BMC 130 may control one or more of fans 132A-132F. For example, BMC 130 may provide control information to a fan controller (not specifically illustrated), which may control one or more of fans 132A-132F. For instance, BMC 130 may provide control information to the fan controller via a SMBus. In one or more embodiments, a fan 132 may generate one or more sounds and/or one or more vibrations as fan 132 operates to move air. In one or more embodiments, the one or more sounds the fan 132 generates may be quantified as one or more sound pressure levels.

In one or more embodiments, chassis 115 may house one or more components of IHS 110. For example, the one or more components of IHS 110 may include one or more of processor 120, BMC 130, volatile memory medium 150, non-volatile memory media 160 and 170, I/O subsystem 175, and network interface 180, among others.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

Figure 1B:
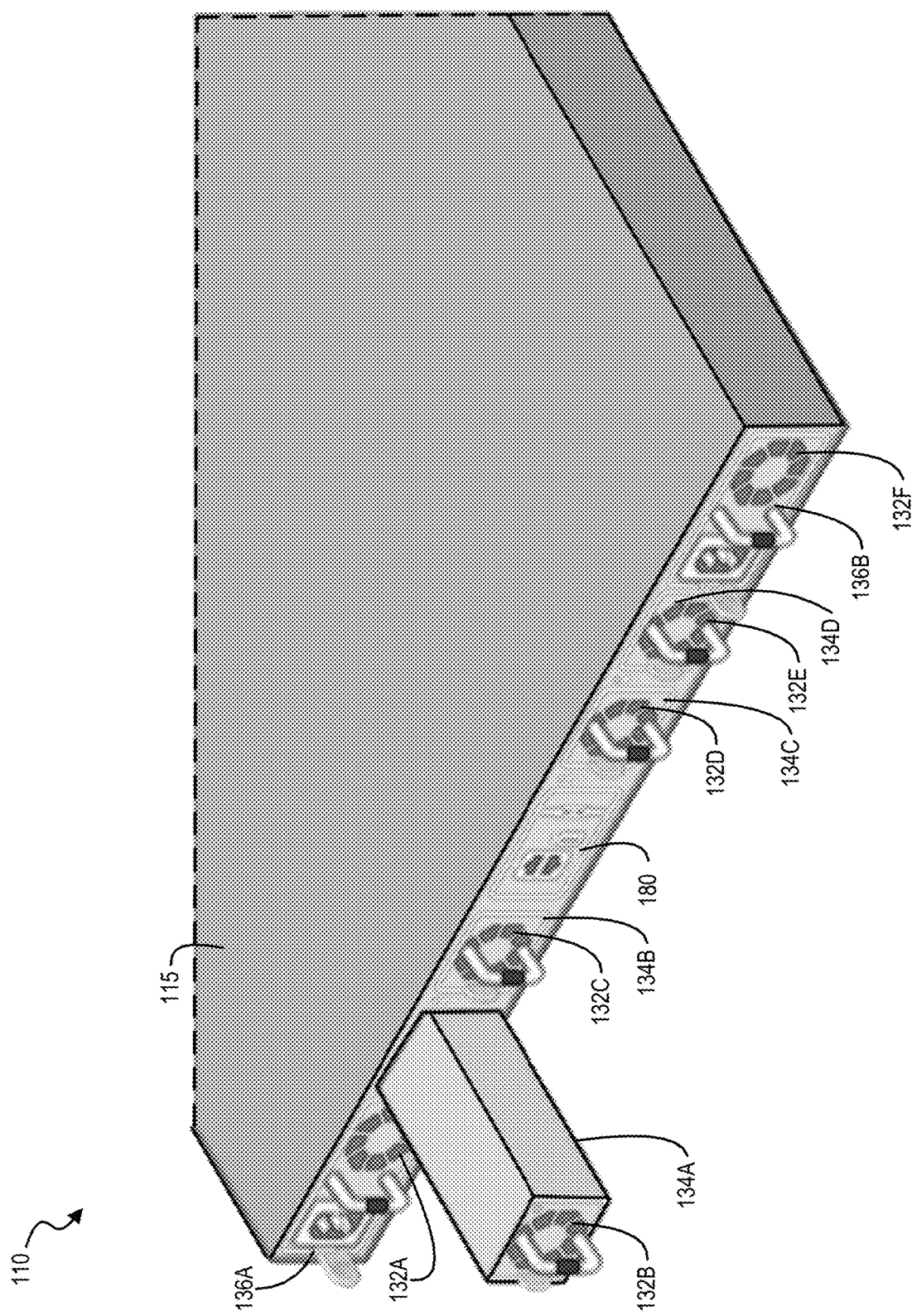
FIG. 1B illustrates another example of an information handling system, according to one or more embodiments.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more Turning now to FIG. 1B, another example of an information handling system is illustrated, according to one or more embodiments. In one or more embodiments, IHS 110 may include chassis 115. For example, chassis 115 may house IHS 110. For instance, chassis 115 may be or may include a housing of IHS 110. In one or more embodiments, a fan module 134 may be mounted in chassis 115. For example, fan modules 134A-134D may be mounted in chassis 115. Although fan modules 134A-134D are illustrated, IHS @10 may include any number of fan modules 134, according to one or more embodiments. In one or more embodiments, a fan module 134 may include a chassis. For example, the chassis of fan module 134 may house components of fan module 134. In one or more embodiments, a fan module 134 may include a fan 132. For example, fan modules 134A-134C may respectively include fans 132B-132E. In one or more embodiments, a fan module 134 may be installed in and/or may be removed from chassis 115. For example, a first fan module 134 may be swapped out with a second fan module 134. For instance, a first fan module 134 may be hot-swapped out with a second fan module 134.

In one or more embodiments, a power supply 136 may be mounted in chassis 115. For example, power supplies 136A and 136B may be mounted in chassis 115. Although power supplies 136A and 136B are illustrated, IHS @10 may include any number of power supplies 136, according to one or more embodiments. In one or more embodiments, a power supply 136 may provide power to one or more components of IHS 110. In one or more embodiments, a power supply 136 may be installed in and/or may be removed from chassis 115. For example, a first power supply 136 may be swapped out with a second power supply 136. For instance, a power supply 136 may be hot-swapped out with a second power supply 136. In one or more embodiments, a power supply 136 may include a fan 132. For example, power supplies 136A and 136B may respectively include fans 132A and 132F.

Figure 2A:
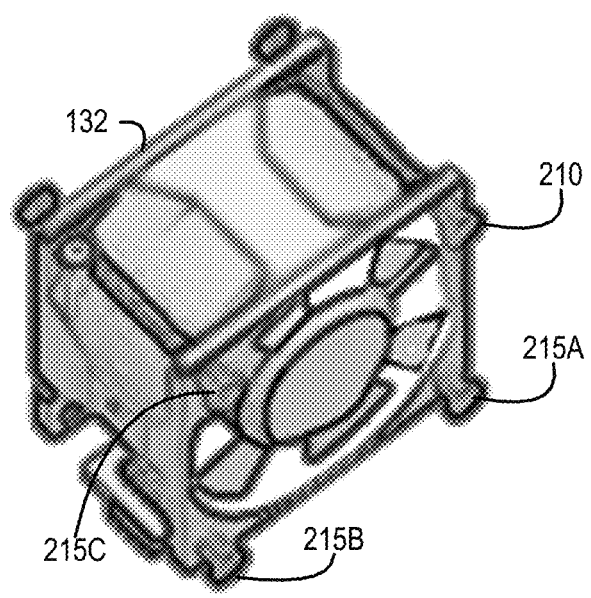
FIG. 2A illustrates an example of a fan that includes an information indication assembly, according to one or more embodiments.

Turning now to FIG. 2A, an example of a fan that includes an information indication assembly is illustrated, according to one or more embodiments. In one or more embodiments, a fan may include an information indication assembly, which may emit one or more light emissions that indicate information. For example, a fan 132 may include an information indication assembly 210. For instance, information indication assembly 210 may indicate information via one or more light emissions.

In one or more embodiments, information indication assembly 210 may implement a fastener, which may be utilized to fasten fan 132 to a fan module 134 or to a power supply 136. For example, information indication assembly 210 may include a fastener, which may be utilized to fasten fan 132 to a fan module 134 or to a power supply 136. For instance, information indication assembly 210 may include a combination of a light emitter and a fastener, which may be utilized to fasten fan 132 to a fan module 134 or to a power supply 136. As an example, the light emitter may indicate information, via one or more light emissions, to a user (e.g., a person).

In one or more embodiments, fasteners 215A-215C may be utilized with fan 132. Although fasteners 215A-215C are illustrated, any number of fasteners 215 may be utilized with fan 132, according to one or more embodiments. In one or more embodiments, a fastener 215 may be utilized to fasten fan 132 to one or more of a chassis of a fan module 134, a chassis of a power supply 136, and chassis 115, among others.

In one or more embodiments, a fastener 215 may include an elastic material. For example, fastener 215 may include an elastomer and/or an elastomer material. In one instance, fastener 215 may include an elastic polymer (e.g., a rubber material). In another instance, fastener 215 may include a rubber foam. In one or more embodiments, a fastener 215 may include a pin. In one or more embodiments, the pin may be inserted into the elastic material of fastener 215. For example, pin may include a rigid material. In one example, the pin utilized with fastener 215 may include a metal or a metal alloy. In another example, the pin utilized with fastener 215 may include a rigid polymer. For instance, the pin utilized with fastener 215 may include a rigid plastic. In one or more embodiments, a rigid material may be associated with a shear modulus. In one example, a rigid material may have a shear modulus greater than or equal to one (1) GPa at room temperature (e.g., seventy-two degrees Fahrenheit). In a second example, a rigid material may have a shear modulus greater than or equal to three (3) GPa at room temperature (e.g., seventy-two degrees Fahrenheit). In another example, a rigid material may have a shear modulus greater than or equal to seven hundred (700) MPa at room temperature (e.g., seventy-two degrees Fahrenheit).

Figure 2B:
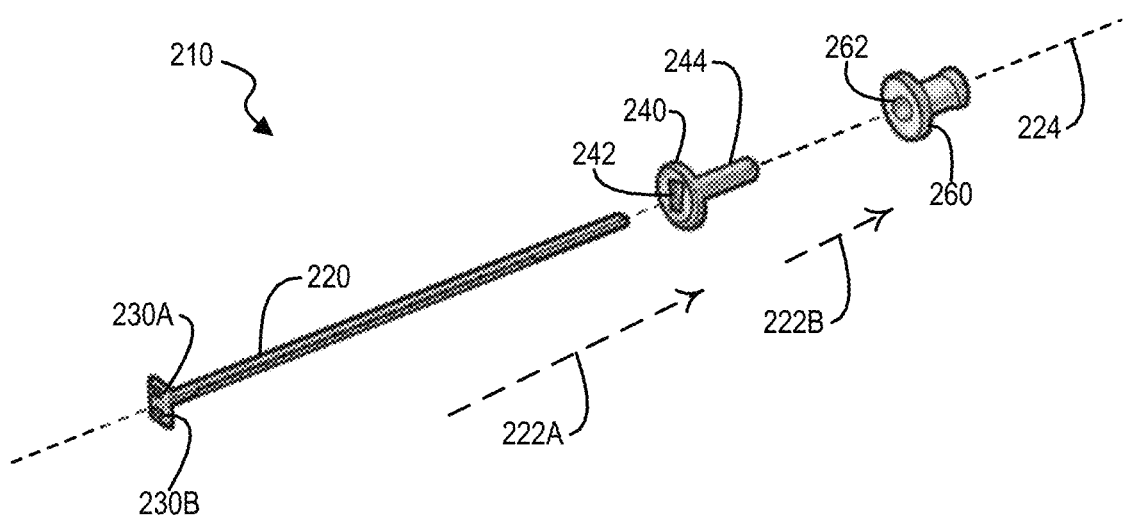
FIG. 2B illustrates an example of an information indication assembly, according to one or more embodiments.

Turning now to FIG. 2B, an example of an information indication assembly is illustrated, according to one or more embodiments. In one or more embodiments, an information indication assembly 210 may include multiple electrical conductors. For example, information indication assembly 210 may include electrical conductors 220. For instance, a printed circuit board (PCB) may include conductors 220. As an example, the PCB may be or include a flexible PCB. In one or more embodiments, an information indication assembly may include one or more light emitters. For example, information indication assembly 210 may include light emitters 230A and 230B. For instance, a light emitter 230 may emit light emissions via one or more colors.

In one or more embodiments, a light emitter 230 may indicate information, via one or more light emissions, to a user (e.g., a person). In one example, BMC 130 may provide one or more signals to information indication assembly 210. In one instance, BMC 130 may provide one or more signals to a light emitter 230. In another instance, a light emitter 230 may indicate information, via one or more light emissions, based at least on the one or more signals from BMC 130. In another example, processor 120 may provide one or more signals to information indication assembly 210. In one instance, processor 120 may provide one or more signals to a light emitter 230. In another instance, a light emitter 230 may indicate information, via one or more light emissions, based at least on the one or more signals from processor 120.

In one or more embodiments, conductors 220 may be fed through a pin 240, as indicated by a dashed line 222A. For example, pin 240 may include an opening 242. For instance, conductors 220 may be fed through opening 242. In one or more embodiments, pin 240 may include a shaft 244. For example, shaft 244 may be hollow. In one or more embodiments, pin 240 may include a rigid material. In one example, pin 240 may include a metal or a metal alloy. In another example, pin 240 may include a rigid polymer. For instance, pin 240 may include a rigid plastic. In one or more embodiments, pin 240 may be fed into or through a grommet 260, as indicated by a dashed line 222B. For example, grommet 260 may include an opening 262. For instance, pin 240 may be fed into or through opening 262. In one or more embodiments, grommet 260 may be configured to house pin 240.

In one or more embodiments, conductors 220, pin 240, and grommet 260 may be assembled along a longitudinal axis 224 of information indication assembly 210. For example, pin 240 and grommet 260 may be assembled along longitudinal axis 224 of information indication assembly 210. For instance, conductors 220 may be closely aligned along longitudinal axis 224. In one or more embodiments, grommet 260 may include an elastic material. For example, grommet 260 may include an elastomer. In one instance, grommet 260 may include an elastic polymer (e.g., a rubber material). In another instance, grommet 260 may include a rubber foam. In one or more embodiments, pin 244 may be inserted into grommet 260. For example, shaft 244 may be inserted into grommet 260. In one or more embodiments, pin 240 and grommet 260 may implement a fastener. For example, the fastener, implemented by pin 240 and grommet 260, may fasten a fan 132 to a fan module 134 or a power supply 136.

Figure 2C:
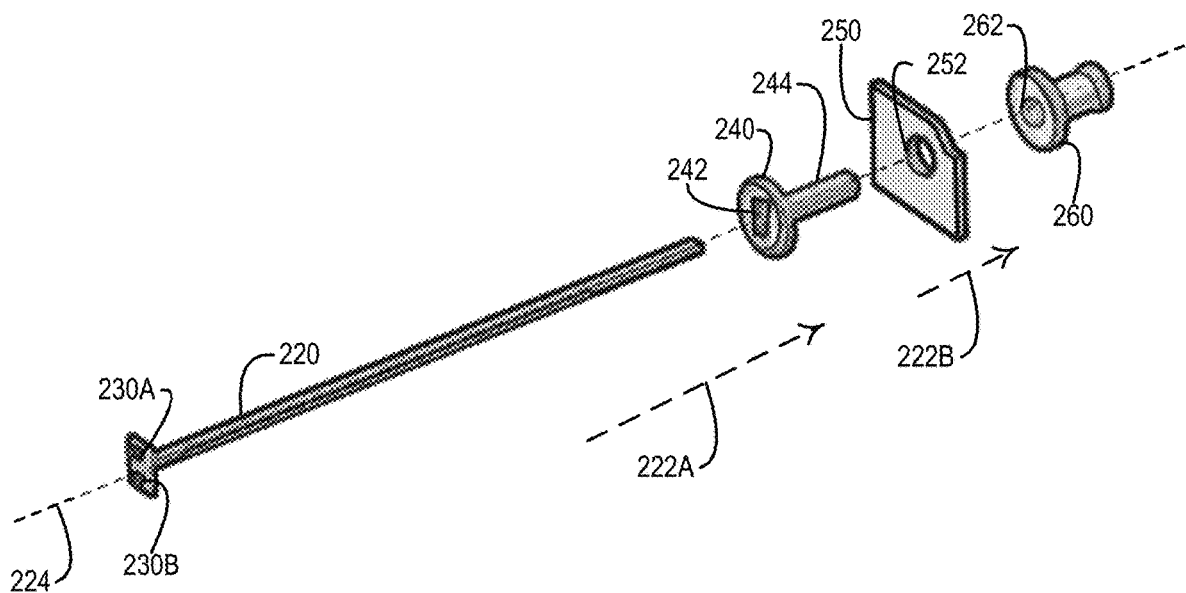
FIG. 2C illustrates a second example of an information indication assembly according to one or more embodiments.

Turning now to FIG. 2C, a second example of an information indication assembly is illustrated, according to one or more embodiments. In one or more embodiments, pin 240 may be fed through a chassis portion 250. For example, chassis portion 250 may include an opening 252. For instance, pin 240 may be fed through opening 252. In one or more embodiments, pin 240 may be fed through chassis portion 250 before pin 240 is fed through grommet 260. In one example, pin 240 and grommet 260 may fasten conductors 220 and/or a PCB to chassis portion 250. In a second example, pin 240 and grommet 260 may fasten light emitters 230A and 230B to chassis portion 250. In a third example, pin 240 and grommet 260 may mount conductors 220 and/or a PCB to chassis portion 250. In another example, pin 240 and grommet 260 may mount light emitters 230A and 230B to chassis portion 250. In one or more embodiments, chassis portion 250 may be a portion of a chassis of a fan 132, a fan module 132, a power supply 136, or chassis 115.

Figure 2D:
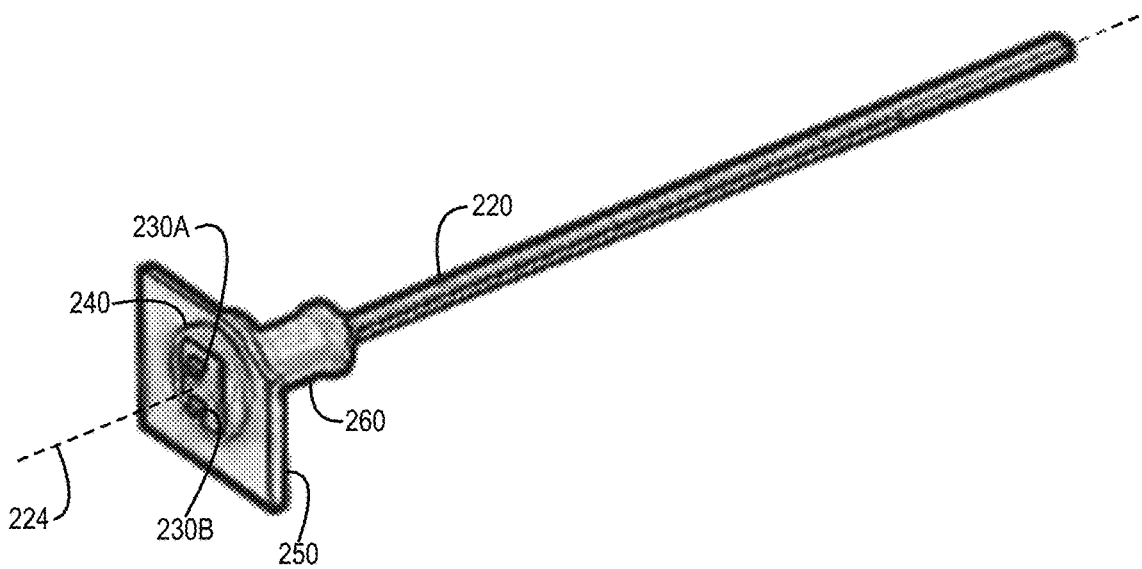
FIG. 2D illustrates another example of an information indication assembly, according to one or more embodiments.

Turning now to FIG. 2D, another example of an information indication assembly is illustrated, according to one or more embodiments. As shown, information indication assembly 210 may be assembled in chassis portion 250.

Figure 2E:
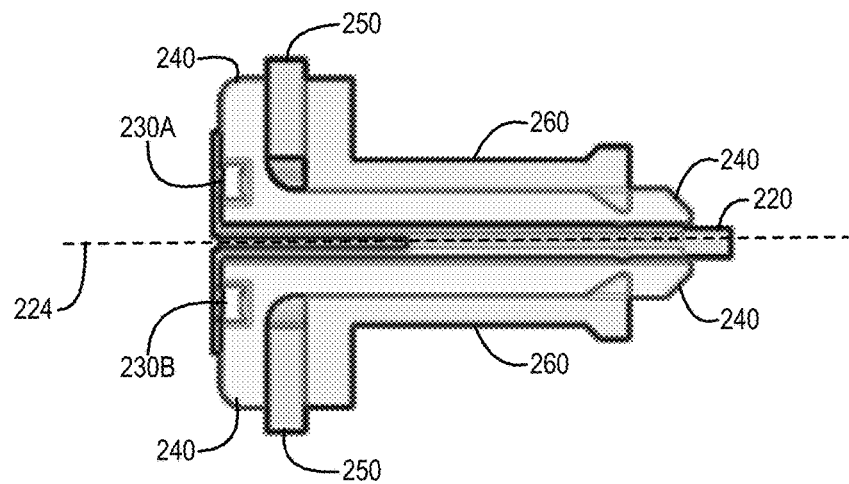
FIG. 2E illustrates an example of a cross section of an information indication assembly, according to one or more embodiments.

Turning now to FIG. 2E, an example of a cross section of an information indication assembly is illustrated, according to one or more embodiments. In one or more embodiments, light emitters 230A and 230B may be mounted flush to pin 240. For example, pin 240 may be mounted flush to chassis portion 250. In one or more embodiments, conductors 220 may be fed through pin 240. For example, conductors 220 may be fed through shaft 244. In one or more embodiments, pin 240 may be mounted within grommet 260.

Figure 2F:
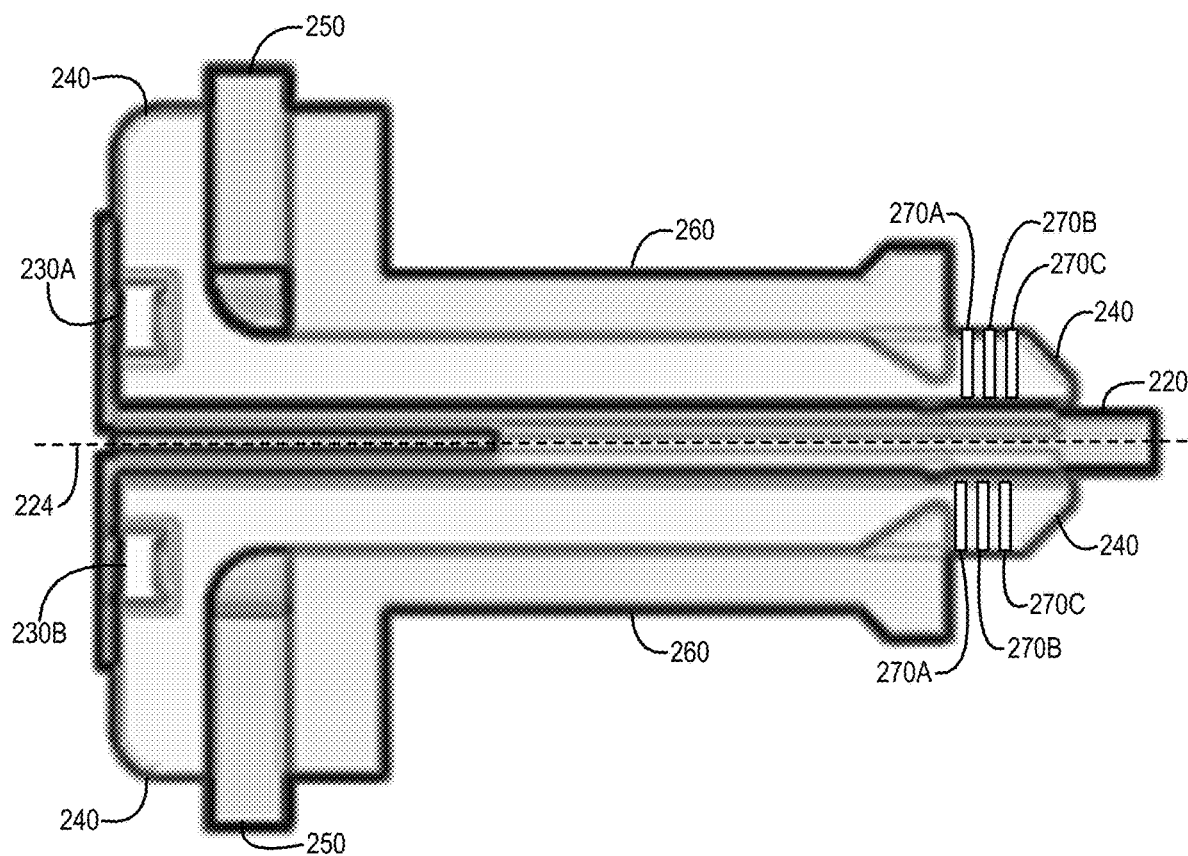
FIG. 2F illustrates another example of a cross section of an information indication assembly, according to one or more embodiments.

Turning now to FIG. 2F, another example of a cross section of an information indication assembly is illustrated, according to one or more embodiments. In one or more embodiments, light emitters 230A and 230B may be mounted flush to pin 240. For example, pin 240 may be mounted flush to chassis portion 250. In one or more embodiments, conductors 220 may be fed through pin 240. For example, conductors 220 may be fed through or into shaft 244. In one or more embodiments, pin 240 may be mounted within grommet 260.

In one or more embodiments, pin 240 may include multiple conductors. For example, pin 240 may include conductors 270A-270C. Although conductors 270A-270C are illustrated, pin 240 may include any number of conductors 270. In one or more embodiments, conductors 270 may be coupled to respective conductors 220. For example, conductors 270 may provide a radial conductor interface to information indication assembly 210. For instance, conductors 270 may be arranged in a radial pattern.

Figure 2G:
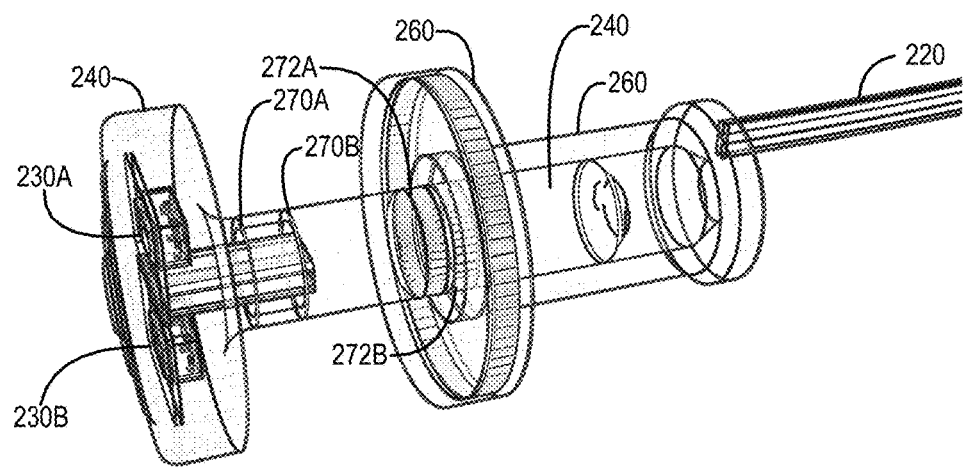
FIG. 2G illustrates an example of an information indication assembly with radial conductors, according to one or more embodiments.

Turning now to FIG. 2G, an example of an information indication assembly with radial conductors is illustrated, according to one or more embodiments. In one or more embodiments, pin 240 may include conductors 270A and 270B. For example, conductors 270 may be coupled to light emitters 230. Although conductors 270A and 270B are illustrated, pin 240 may include any number of conductors 270. In one or more embodiments, conductors 270 may be arranged as a radial interface. For example, conductors 270 may be arranged in a radial pattern. In one or more embodiments, conductors 270A and 270B may be respectively coupled to conductors 272A and 272B of grommet 260. For example, conductors 270A and 270B may be respectively coupled to conductors 272A and 272B when pin 240 is inserted into grommet 260. In one or more embodiments, conductors 272A and 272B may be coupled conductors 220. For example, conductors 220 may be coupled to grommet 260. Although conductors 272A and 272B are illustrated, grommet 260 may include any number of conductors 272, according to one or more embodiments.

Figure 2H:
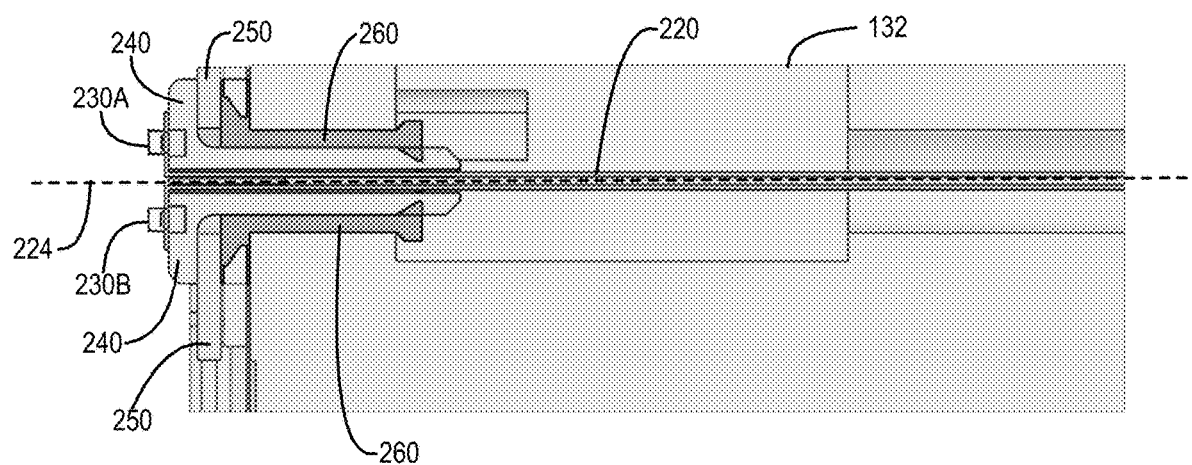
FIG. 2H illustrates an example of a cross section of an information indication assembly mounted in a fan, according to one or more embodiments.

Turning now to FIG. 2H, an example of a cross section of an information indication assembly mounted in a fan is illustrated, according to one or more embodiments. As shown, one or more components of information indication assembly 210 may be mounted in a fan 132. For example, chassis portion 250 may be a portion of a chassis of a fan 132. In one or more embodiments, light emitters 230A and 230B may be mounted flush to pin 240. For example, pin 240 may be mounted flush to chassis portion 250. In one or more embodiments, conductors 220 may be fed through pin 240. For example, conductors 220 may be fed through or into shaft 244. In one or more embodiments, pin 240 may be mounted within grommet 260.

Figure 2I:
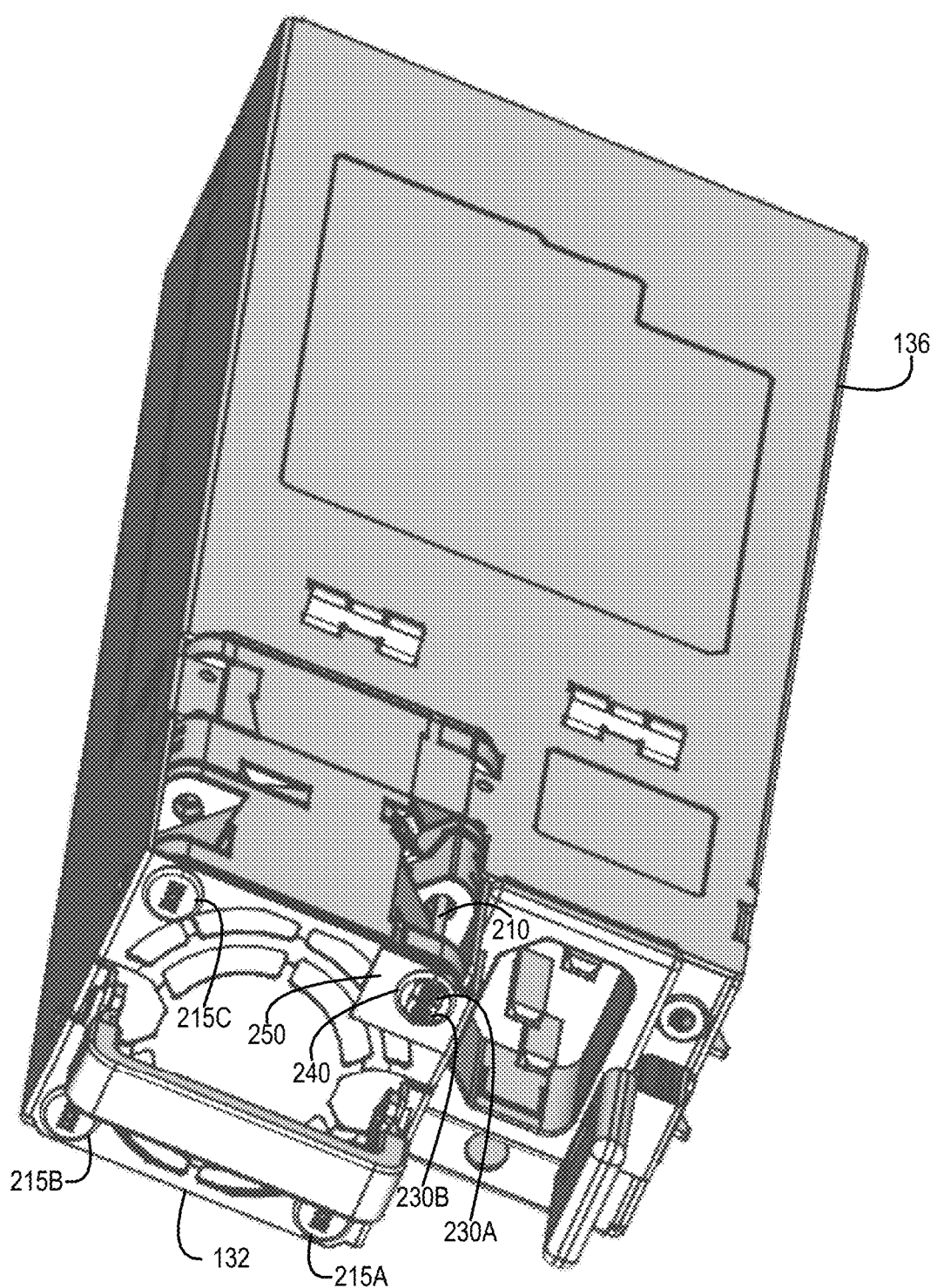
FIG. 2I illustrates an example of a power supply that includes a fan and an information indication assembly, according to one or more embodiments.

Turning now to FIG. 2I, an example of a power supply that includes a fan and an information indication assembly is illustrated, according to one or more embodiments. In one or more embodiments, a power supply 136 may include a fan 132. For example, fan 132 may include an information indication assembly 210. For instance, information indication assembly 210 may fasten or assist in fastening fan 132 to power supply 136.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium, coupled to the at least one processor, that stores an operating system and at least one application executable by the at least one processor;
   a fan; and
   an information indication assembly that includes:
      at least one light emitter;
      a first plurality of conductors coupled to the at least one light emitter;
      a pin that includes a rigid material and that permits the first plurality of conductors to pass through; and
      a grommet that includes an elastic material and configured to house the pin;
   wherein the pin and the grommet are aligned along a longitudinal axis of the information indication assembly;
   wherein the pin and the grommet form a fastener of the fan; and
   wherein the elastic material mitigates vibrations from the fan to at least one component of the information handling system.

2. The information handling system of claim 1, wherein the rigid material includes at least one of a metal and a metal alloy.

3. The information handling system of claim 1, wherein the rigid material includes a rigid polymer.

4. The information handling system of claim 1, wherein the elastic material includes a rubber polymer.

5. The information handling system of claim 1, wherein the at least one light emitter includes at least one light emitting diode (LED).

6. The information handling system of claim 1,
   wherein the information indication assembly further includes a printed circuit board; and
   wherein the printed circuit board includes the first plurality of conductors.

7. The information handling system of claim 6, wherein the printed circuit board is a flexible printed circuit board.

8. The information handling system of claim 1,
   wherein the pin includes a second plurality of conductors arranged in a radial pattern; and
   wherein the second plurality of conductors are coupled to the first plurality of conductors.

9. The information handling system of claim 1, further comprising:
   a fan module;
   wherein the fan module includes the fan.

10. The information handling system of claim 1, further comprising:
    a power supply;
    wherein the power supply includes the fan.

11. An information indication assembly, comprising:
    at least one light emitter;
    a first plurality of conductors coupled to the at least one light emitter;
    a pin that includes a rigid material and that permits the first plurality of conductors to pass through; and
    a grommet that includes an elastic material and configured to house the pin;
    wherein the pin and the grommet are aligned along a longitudinal axis of the information indication assembly;
    wherein the pin and the grommet form a fastener of a fan associated with an information handling system; and
    wherein the elastic material mitigates vibrations from the fan.

12. The information indication assembly of claim 11, wherein the rigid material includes at least one of a metal and a metal alloy.

13. The information indication assembly of claim 11, wherein the rigid material includes a rigid polymer.

14. The information indication assembly of claim 11, wherein the elastic material includes a rubber polymer.

15. The information indication assembly of claim 11, wherein the at least one light emitter includes at least one light emitting diode (LED).

16. The information indication assembly of claim 11, further comprising:
    a printed circuit board;
    wherein the printed circuit board includes the first plurality of conductors.

17. The information indication assembly of claim 16, wherein the printed circuit board is a flexible printed circuit board.

18. The information indication assembly of claim 11,
    wherein the pin includes a second plurality of conductors arranged in a radial pattern; and
    wherein the second plurality of conductors are coupled to the first plurality of conductors.

19. The information indication assembly of claim 11, wherein a fan module of the information handling system includes the fan.

20. The information indication assembly of claim 11, wherein a power supply of the information handling system includes the fan.

* * * * *